United States Patent
Zemany et al.

(10) Patent No.: US 10,907,936 B2
(45) Date of Patent: Feb. 2, 2021

(54) STATE ESTIMATION

(71) Applicant: BAE SYSTEMS INFORMATION AND ELECTRONIC SYSTEMS INTEGRATION INC., Nashua, NH (US)

(72) Inventors: Paul D. Zemany, Amherst, NH (US); Matthew F. Chrobak, Groton, MA (US); Egor V. Degtiarev, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 138 days.

(21) Appl. No.: 16/414,851

(22) Filed: May 17, 2019

(65) Prior Publication Data

US 2020/0363162 A1    Nov. 19, 2020

(51) Int. Cl.
  *F41G 7/22*  (2006.01)
  *G05D 1/10*  (2006.01)
  *G01P 3/44*  (2006.01)

(52) U.S. Cl.
  CPC ........... *F41G 7/2246* (2013.01); *F41G 7/222* (2013.01); *F41G 7/2213* (2013.01); *F41G 7/2293* (2013.01); *G01P 3/44* (2013.01); *G05D 1/108* (2013.01)

(58) Field of Classification Search
  CPC ...... F41G 7/2246; F41G 7/2213; F41G 7/222; F41G 7/2293
  USPC ...................................................... 73/514.39
  See application file for complete search history.

(56) References Cited

U.S. PATENT DOCUMENTS

| | | | | |
|---|---|---|---|---|
| 4,619,421 | A * | 10/1986 | Trummer | F41G 7/2213 244/3.16 |
| 5,141,174 | A * | 8/1992 | Sellers | F41G 7/2213 244/3.21 |
| 5,669,581 | A * | 9/1997 | Ringer | F41G 7/222 244/3.16 |
| 5,695,152 | A * | 12/1997 | Levy | F41G 7/222 244/3.13 |
| 6,433,533 | B1 * | 8/2002 | Clymer | F41G 7/222 324/160 |
| 6,886,774 | B2 * | 5/2005 | Lamorlette | G05D 1/108 244/3.15 |
| 7,395,987 | B2 * | 7/2008 | Lindquist | F41G 7/305 244/3.21 |
| 7,500,636 | B2 * | 3/2009 | Bredy | F41G 7/2253 244/3.1 |
| 7,834,301 | B2 * | 11/2010 | Clingman | G05D 1/108 244/3.15 |
| 8,269,667 | B2 * | 9/2012 | Vander Velde | F41G 7/222 342/357.36 |
| 10,571,271 | B2 * | 2/2020 | Faulkner | F41G 7/36 |

(Continued)

*Primary Examiner* — Samir Abdosh
(74) *Attorney, Agent, or Firm* — Sand, Sebolt Wernow LPA

(57) ABSTRACT

A system and method for state estimation in spinning projectiles is provided. The state estimation is based, at least in part, on magnetic sensor data, angular velocity data, and correction terms applied to the magnetic sensor data and the angular velocity data. The system and method for state estimation in spinning projectiles estimates roll angles and roll rates of the spinning projectiles. The roll angle and roll rate estimates allow steering commands to be applied to steer the spinning projectiles in the proper direction.

20 Claims, 8 Drawing Sheets

(56) References Cited

U.S. PATENT DOCUMENTS

| | | | | |
|---|---|---|---|---|
| 10,704,874 | B2* | 7/2020 | Lotan | F41G 7/226 |
| 2002/0178819 | A1* | 12/2002 | Clymer | G01P 3/44 |
| | | | | 73/514.39 |
| 2005/0001088 | A1* | 1/2005 | Lamorlette | G05D 1/108 |
| | | | | 244/3.15 |
| 2006/0289694 | A1* | 12/2006 | Bredy | F41G 7/2253 |
| | | | | 244/3.1 |
| 2007/0023567 | A1* | 2/2007 | Lindquist | F41G 7/305 |
| | | | | 244/3.1 |
| 2009/0272839 | A1* | 11/2009 | Clingman | G05D 1/108 |
| | | | | 244/3.1 |
| 2012/0068884 | A1* | 3/2012 | Vander Velde | F41G 7/305 |
| | | | | 342/357.36 |
| 2018/0306563 | A1* | 10/2018 | Lotan | F41G 7/2293 |
| 2020/0018579 | A1* | 1/2020 | Ell | F42B 12/365 |

* cited by examiner

STATE ESTIMATION

TECHNICAL FIELD

The present disclosure relates generally to state estimation. More particularly, the present disclosure relates to state estimation in spinning projectiles. Specifically, the present disclosure relates to state estimation in spinning projectiles based, at least in part, on magnetic sensor data, angular velocity data, and correction terms applied to the magnetic sensor data and the angular velocity data.

BACKGROUND

An accurate roll angle estimate is needed to steer a spinning projectile, or a guided projectile or missile. The roll angle estimate allows a steering command to be applied in the proper direction. Exemplary steering commands include but are not limited to, up/down turns, left/right turns, and turns in an oblique direction to adjust the trajectory of the spinning projectile. It should be noted that the projectile can spin or not spin; however, the steering command must be in the proper direction in relation to down.

The roll angle estimate is measured with respect to gravity. As such, a reference relative to gravity is needed, which may be an up vector or down vector. For example, up vector or down vector are defined as when the roll angle of the spinning projectile is zero and is referenced by the direction of gravity. One method of estimating roll relative to gravity utilizes the earth's magnetic field, which may also be referred to as the geomagnetic field; however, distortion caused by self magnetic fields causes errors in estimating the up or down vector. Some sources of distortion include, but are not limited to, a permanent magnetic field of the spinning projectile, a permanent magnetic field of various components of the spinning projectile, sensor offsets, induced magnetic fields from the geomagnetic field, magnetic fields produced by eddy currents on the spinning shell body, and magnetic fields generated by electrical currents produced by components on the spinning projectile

SUMMARY

Issues continue to exist with roll angle estimation in spinning projectiles. The present disclosure addresses these and other issues by providing a system and method for roll angle estimation in spinning projectiles based, at least in part, on magnetic sensor data and correction terms applied to the magnetic sensor data.

In one aspect, an exemplary embodiment of the present disclosure may provide a method comprising providing known geomagnetic field vectors to a spinning projectile; firing the spinning projectile from a launch assembly towards a target; estimating a sensor offset of at least one magnetic sensor; estimating a first distortion caused by a first source of distortion; wherein the first source of distortion is a permanent magnetic field of the spinning projectile; estimating at least one second distortion caused by at least one second source of distortion; estimating, with the at least magnetic sensor, a magnetic data output associated with a local magnetic field relative to the spinning projectile; removing the estimated sensor offset, the estimated first distortion, and the estimated at least one second distortion from the magnetic data output associated with the local magnetic field to provide a corrected magnetic data output associated with the local magnetic field; determining corrected geomagnetic field vectors of the spinning projectile based, at least in part, on the known geomagnetic field vectors and the corrected magnetic data output associated with the local magnetic field; determining an elevation of the spinning projectile; determining an azimuth of the spinning projectile; estimating a roll angle of the spinning projectile based, at least in part, on the corrected geomagnetic field vectors of the spinning projectile, the elevation of the spinning projectile, and the azimuth of the spinning projectile; estimating, with at least one angular rate sensor, a roll rate of the spinning projectile; integrating the estimated roll rate; merging the estimated roll angle with the integrated estimated roll rate to provide an updated estimated roll angle of the spinning projectile and an estimated bias of the at least one angular rate sensor; and removing the bias of the at least one angular rate sensor to provide an updated estimated roll rate of the spinning projectile.

In one example, the method includes steering the spinning projectile based, at least in part, on the updated estimated roll angle of the spinning projectile. In another example, the method includes steering the spinning projectile based, at least in part, on the updated estimated roll rate of the spinning projectile.

The method further includes allowing the spinning projectile to complete at least one revolution before estimating the sensor offset of the at least one magnetic sensor and the first distortion caused by the first source of distortion. In one example, merging the estimated roll angle with the integrated estimated roll rate to provide an updated estimated roll angle of the spinning projectile and an estimated bias of the at least one angular rate sensor is accomplished via a Kalman filter.

In one example, the at least one second distortion is an induced magnetic field of the spinning projectile; the method further comprising: applying a correction matrix to the magnetic data output associated with the local magnetic field to remove the induced magnetic field of the spinning projectile. In another example, the at least one second distortion is at least one magnetic field produced by at least one current; the method further comprising: applying a calibration coefficient to the magnetic data output associated with the local magnetic field to remove effects of the at least one magnetic field produced by the at least one current.

The method further includes providing a precision guidance kit on the spinning projectile. In one example, the at least one magnetic sensor is a three-axis magnetometer and the at least one angular rate sensor is a roll gyro.

In another aspect, an exemplary embodiment of the present disclosure may provide a state estimation system for a spinning projectile, comprising: at least one processor that receives known geomagnetic field vectors; at least one magnetic sensor that estimates a magnetic data output associated with a local magnetic field relative to the spinning projectile; a first source of distortion providing a first distortion; wherein the first source of distortion is a permanent magnetic field of the spinning projectile; first estimation logic that estimates a sensor offset of the at least one magnetic sensor; second estimation logic that estimates the first distortion; at least one second distortion source providing at least one second distortion; third estimation logic that estimates the second distortion; first correction logic that removes the estimated sensor offset, the estimated first distortion, and the estimated at least one second distortion from the magnetic data output associated with the local magnetic field to provide a corrected magnetic data output associated with the local magnetic field; and geomagnetic logic that determines corrected geomagnetic field vectors of the spinning projectile based, at least in part, on the known geomagnetic field vectors and the corrected magnetic data output associated with the local magnetic field; elevation logic that determines an elevation of the spinning projectile; azimuth logic that determines an azimuth of the spinning projectile; roll angle estimation logic that estimates a roll angle of the spinning projectile based, at least in part, on the corrected geomagnetic field vectors of the spinning projectile, the elevation of the spinning projectile, and the azimuth of the spinning projectile; at least one angular rate sensor that estimates a roll rate of the spinning projectile; integration logic that integrates the estimated roll rate; merging logic that merges the estimated roll angle with the integrated estimated roll rate to provide an updated estimated roll angle of the spinning projectile and an estimated bias of the at least one angular rate sensor; and second correction logic that removes the bias of the at least one angular rate sensor to provide an updated estimated roll rate of the spinning projectile.

In one example, the state estimation system further includes steering logic that steers the spinning projectile based, at least in part, on the updated estimated roll angle of the spinning projectile. In another example, the state estimation system further includes steering logic that steers the spinning projectile based, at least in part, on the updated estimated roll rate of the spinning projectile.

The state estimation system further includes a central longitudinal axis of the spinning projectile; a first magnetic field vector of the at least one magnetic sensor positioned along the central longitudinal axis of the spinning; a second magnetic field vector of the at least one magnetic sensor orthogonal to the first magnetic field vector; and a third magnetic field vector of the at least one magnetic sensor orthogonal to the first magnetic field vector.

The state estimation system further includes a precision guidance kit carried by the spinning projectile; wherein the precision guidance kit comprises a canard assembly including at least one canard that is moveable.

In one example, the at least one magnetic sensor and the at least one angular rate sensor are carried by the precision guidance kit. In one example, the at least one magnetic sensor is a three-axis magnetometer and the at least one angular rate sensor is a roll gyro.

In one example, the at least one second distortion is at least one of an induced magnetic field, a magnetic field produced by at least one current associated with the spinning projectile, and a magnetic field produced by at least one eddy current.

In yet another aspect, an exemplary embodiment of the present disclosure may provide a system and method for state estimation in spinning projectiles. The state estimation is based, at least in part, on magnetic sensor data, angular velocity data, and correction terms applied to the magnetic sensor data and the angular velocity data. The system and method for state estimation in spinning projectiles estimates roll angles and roll rates of the spinning projectiles. The roll angle and roll rate estimates allow steering commands to be applied to steer the spinning projectiles in the proper direction.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
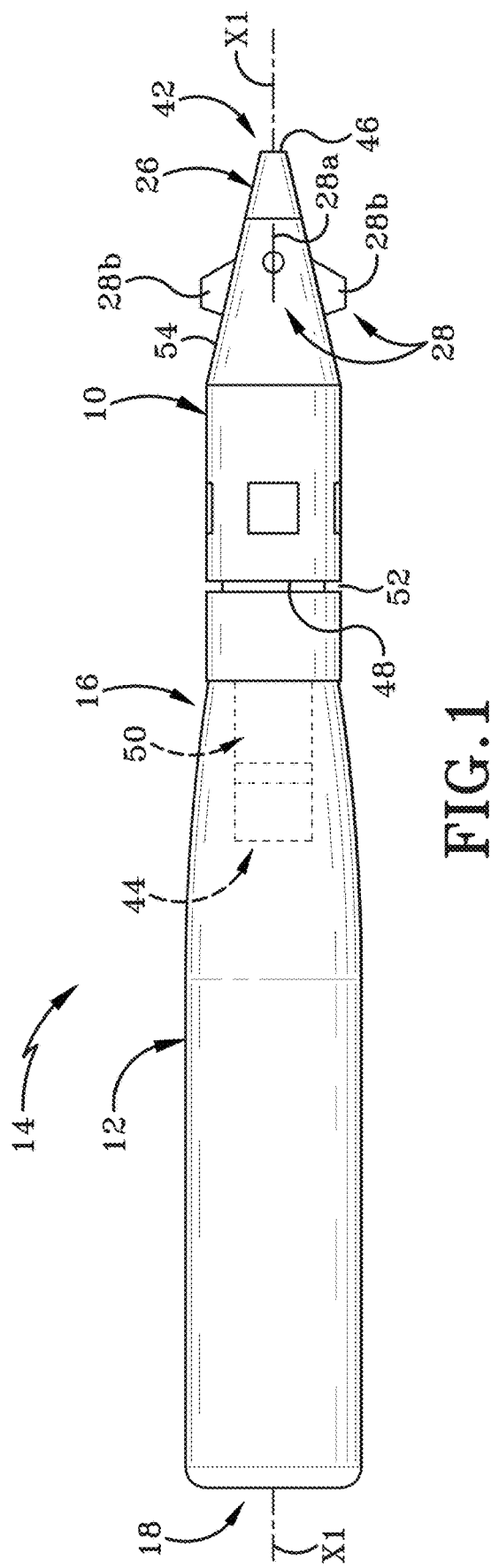
FIG. 1 is a schematic view of state estimation system carried by a guided projectile including a munition body and a precision guidance kit in accordance with one aspect of the present disclosure.
Figure 2:
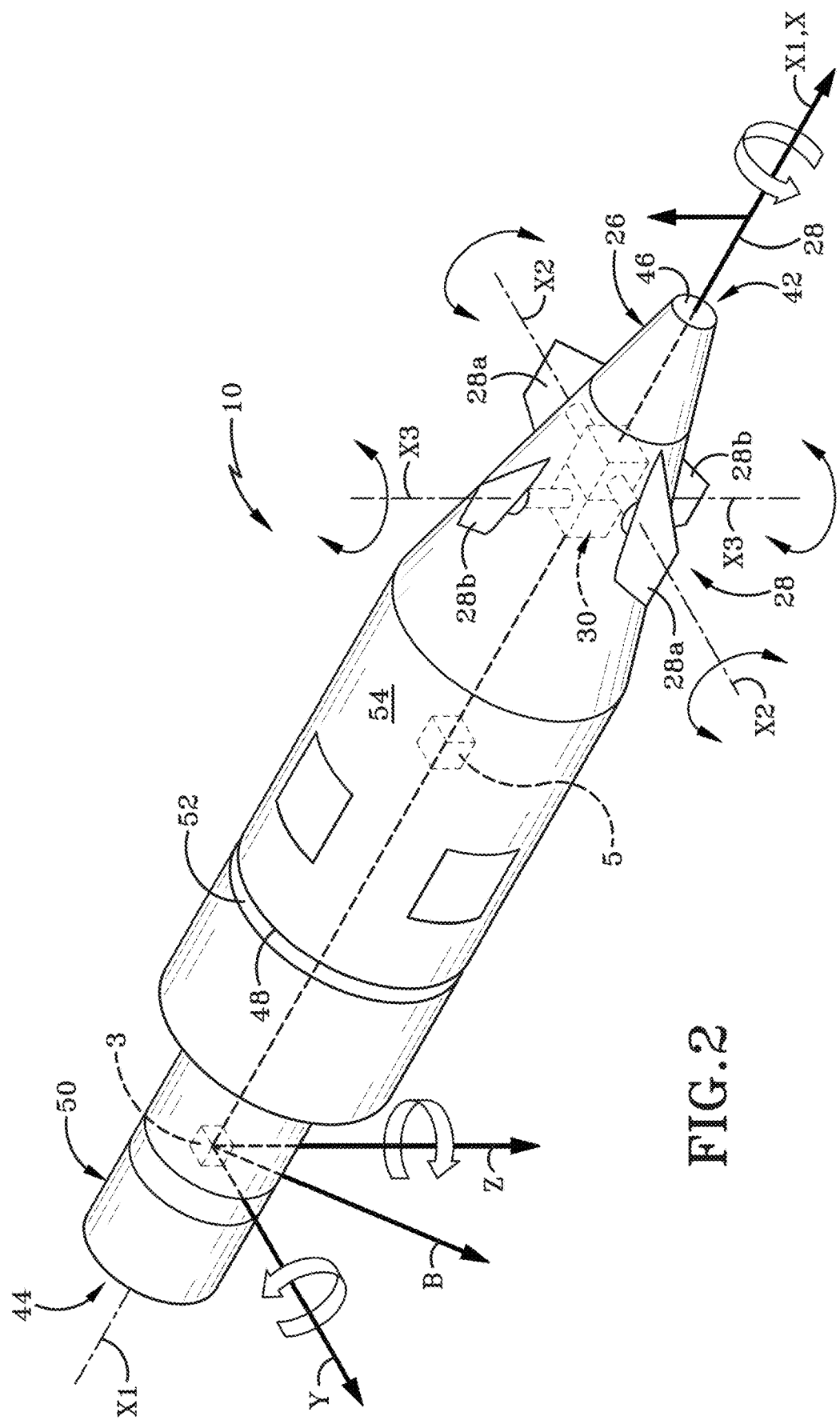
FIG. 2 is a schematic perspective view of the precision guidance kit.
Figure 3:
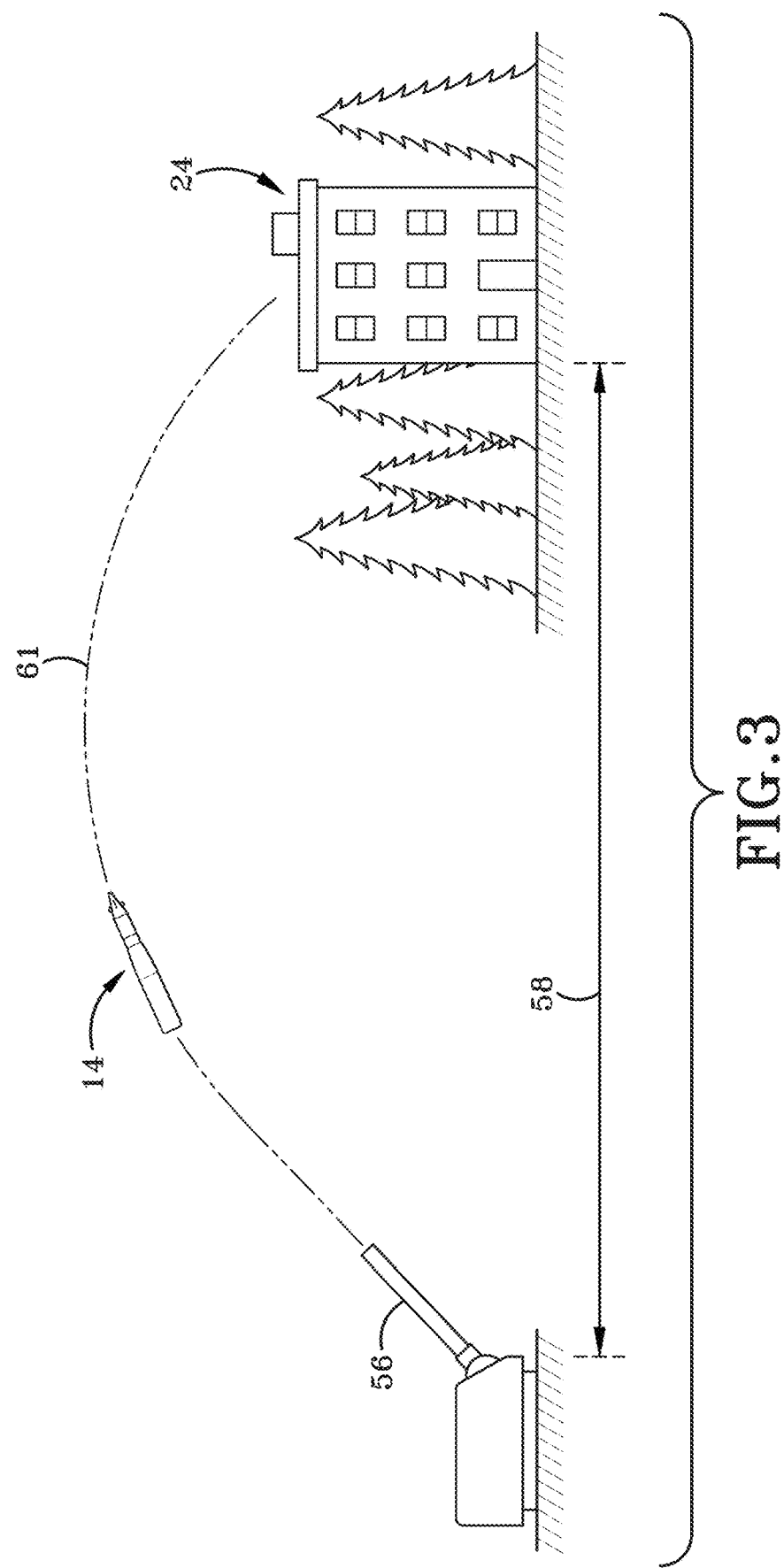
FIG. 3 is an operational schematic view of the state estimation system carried by the guided projectile.

As depicted throughout FIG. 1 through FIG. 3, a state estimation system in accordance with certain aspects of the present disclosure is shown generally at 1. The state estimation system 1 utilizes the earth's magnetic field, which may also be referred to as the geomagnetic field, to estimate a roll angle $\phi$ and a roll rate as further described below.

The state estimation system 1 includes at least one magnetic sensor 3, at least angular rate sensor 5, at least one non-transitory computer readable storage medium 7 having instructions encoded thereon that, when executed by at least one processor 9, implements various logics, such as, for example, first estimation logic 11, second estimation logic 13, third estimation logic 15, first correction logic 17, geomagnetic logic 19, elevation logic 21, azimuth logic 23, roll angle estimation logic 25, integration logic 27, merging logic 29, second correction logic 31, and steering logic 33. Although the state estimation system 1 has been described as including particular logics, it is to be understood that the state estimation system 1 may include any suitable logics.

The state estimation system 1 is operably engaged with a spinning projectile 10. The spinning projectile 10 may be any suitable spinning projectile, such as, for example, any launched projectile such as rockets, mortars, missiles, cannon shells, shells, bullets and the like that are configured to have in-flight guidance. Although the state estimation system 1 has been described as being operably engage with a spinning projectile, it is to be understood that the state estimation system 1 may be operably engaged with any suitable projectile, such as a despun portion of a spinning projectile.

In one particular embodiment, the spinning projectile 10 is a precision guidance kit (PGK), which is also shown generally at 10, operatively coupled with a munition body 12, which may also be referred to as a projectile, to create a guided projectile 14. The PGK 10 is connected to the munition body 12 via a threaded connection; however, the PGK 10 may be connected to the munition body 12 in any suitable manner. Although the spinning projectile 10 is depicted as being the PGK 10 operatively coupled to the munition body 12 forming the guided projectile 14, it is to be understood that the spinning projectile 10 may be any suitable spinning projectile.

FIG. 1 depicts that the munition body 12 includes a front end 16 and an opposite tail or rear end 18 defining a longitudinal direction therebetween. The munition body 12 includes an annular edge 20 (FIG. 1A), which, in one particular embodiment, is a leading edge on the munition body 12 such that the annular edge 20 is a leading annular edge that is positioned at the front end 16 of the munition body 12. The munition body 12 defines a cylindrical cavity 22 extending rearward from the annular edge 20 longitudinally centrally along a center of the munition body 12. The munition body 12 is formed from material, such as metal, that is structurally sufficient to carry an explosive charge configured to detonate or explode at, or near, a target 24 (FIG. 3). The munition body 12 may include tail flights (not shown) which help stabilize the munition body 12 during flight.

Figure 1A:
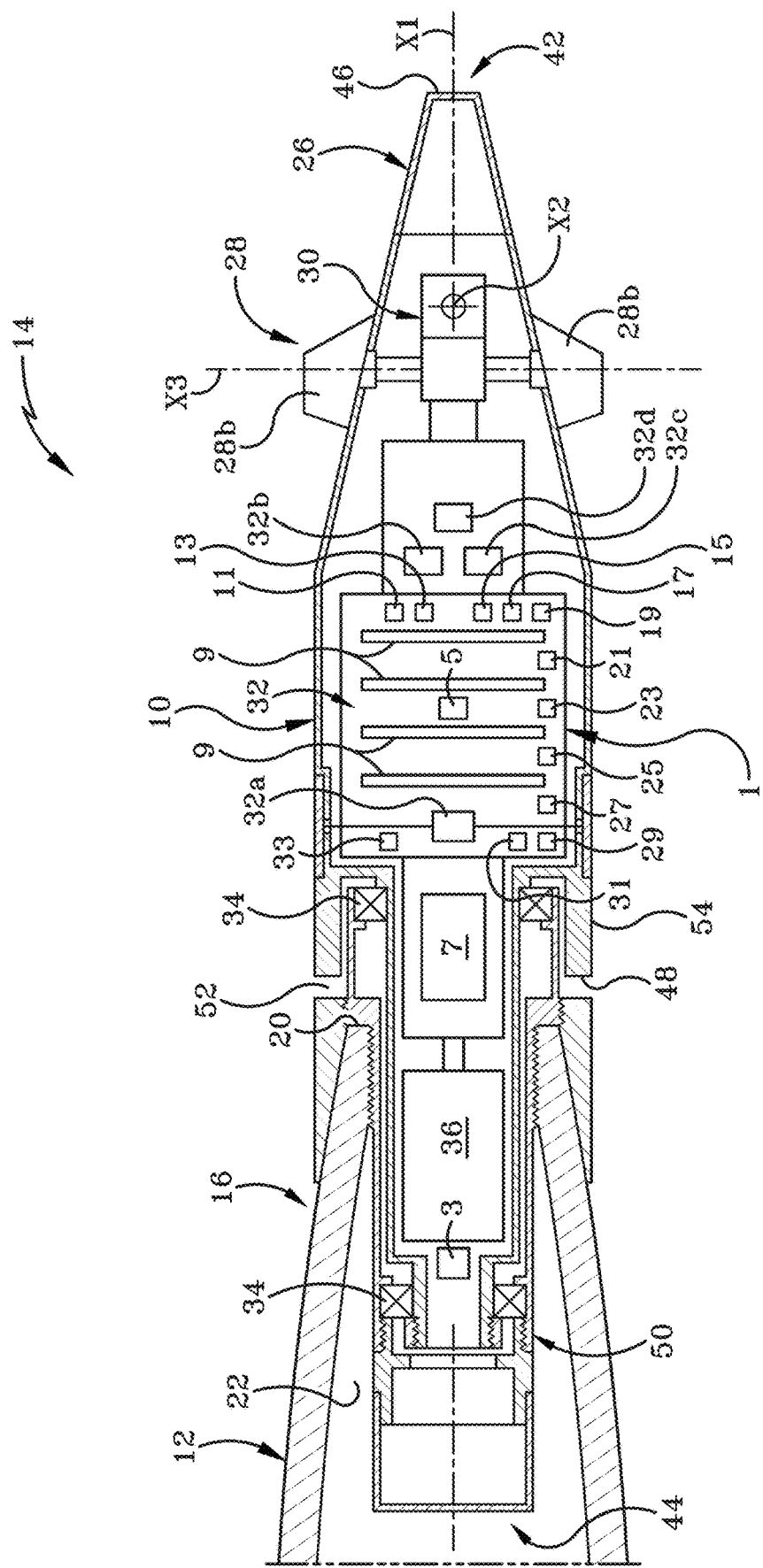
FIG. 1A is an enlarged fragmentary cross-section view of the state estimation system carried by the guided projectile in accordance with one aspect of the present disclosure.

FIG. 1 and FIG. 1A depict that the PGK 10, which may also be referred to as a despun assembly, includes, in one example, a fuze setter 26, a canard assembly 28 having one or more canards 28a, 28b, a control actuation system (CAS) 30, a guidance, navigation and control (GNC) section 32, at least one bearing 34, and a battery 36. In one particular embodiment, the state estimation system 1 is provided within the GNC section 32 of the PGK 10. As such, the at least one magnetic sensor 3 and the at least angular rate sensor 5 are carried within the GNC section 32 of the PGK 10. Although the state estimation system 1 has been described as being provided within the GNC section 32 of the PGK 10, the state estimation system 1 may be provided in any suitable manner on the PGK 10 or any other suitable portion of the guided projectile 14.

In one particular embodiment, the at least one magnetic sensor 3 is a three-axis magnetometer, which is also denoted as 3, and the at least one angular rate sensor 5 is a roll gyro, which is also denoted as 5. One exemplary roll gyro is a microelectromechanical systems (MEMS) gyroscope; however, any suitable roll gyro may be utilized. It is envisioned that the PGK 10 may include other sensors, including, but not limited to, a GPS receiver 32a, an MEMS accelerometer 32b, at least one inertial measurement unit (IMU) 32c, at least one inertial navigation system (INS) 32d, laser guided sensors (not shown), electro-optical sensors (not shown), imaging sensors (not shown), or any other suitable sensors.

The at least one magnetic sensor 3 is configured to sense the local geomagnetic field relative to the PGK 10 and output data representing the local geomagnetic field. The at least one angular rate sensor 5 is configured to sense the angular velocity of the PGK 10. The data from the at least one magnetic sensor 3 and the at least one angular rate sensor 5 may be depicted and/or represented utilizing any suitable coordinate systems.

The PGK 10 includes a nose or front end 42 and an opposite tail or rear end 44. When the PGK 10 is connected to the munition body 12, a longitudinal axis X1 extends centrally from the rear end 18 of the munition body to the front end 42 of the PGK 10. FIG. 1A depicts one embodiment of the PGK 10 as generally cone-shaped and defines the nose 42 of the PGK 10. The one or more canards 28a, 28b of the canard assembly 28 are controlled via the CAS 30. The PGK 10 further includes a forward tip 46 and an annular edge 48. In one embodiment, the annular edge 48 is a trailing annular edge 48 positioned rearward from the tip 46. The annular edge 48 is oriented centrally around the longitudinal axis X1. The annular edge 48 on the PGK 10 is positioned forwardly from the leading edge 20 on the munition body 12. The PGK assembly 10 further includes a central cylindrical extension 50 that extends rearward and is received within the cylindrical cavity 22 via a threaded connection.

Annular edge 48 is shaped and sized complementary to the leading edge 20. In one particular embodiment, a gap 52 is defined between the annular edge 48 and the leading edge 20. The gap 52 may be an annular gap surrounding the extension 50 that is void and free of any objects in the gap 52 so as to effectuate the free rotation of the PGK 10 relative to the munition body 12.

The PGK 10 includes at least one lift canard 28a extending radially outward from an exterior surface 54 relative to the longitudinal axis X1. The at least one lift canard 28a is pivotably connected to a portion of the PGK 10 via the CAS 30 such that the lift canard 28a pivots relative to the exterior surface 54 of the PGK 10 about a pivot axis X2. In one particular embodiment, the pivot axis X2 of the lift canard 28a intersects the longitudinal axis X1. In one particular embodiment, a second lift canard 28a is located diametrically opposite the at least one lift canard 28a, which could also be referred to as a first lift canard 28a. The second lift canard 28a is structurally similar to the first lift canard 28a such that it pivots about the pivot axis X2. The PGK 10 can control the pivoting movement of each lift canard 28a via the CAS 30. The first and second lift canards 28a cooperate to control the lift of the guided projectile 14 while it is in motion after being fired from a launch assembly 56 (FIG. 3).

The PGK 10 further includes at least one roll canard 28b extending radially outward from the exterior surface 54 relative to the longitudinal axis X1. In one example, the at least one roll canard 28b is pivotably connected to a portion of the PGK 10 via the CAS 30 such that the roll canard 28b pivots relative to the exterior surface 54 of the PGK 10 about a pivot axis X3. In one particular embodiment, the pivot axis X3 of the roll canard 28b intersects the longitudinal axis X1. In one particular embodiment, a second roll canard 28b is located diametrically opposite the at least one roll canard 28b, which could also be referred to as a first roll canard 28b. The second roll canard 28b is structurally similar to the first roll canard 28b such that it pivots about the pivot axis X3. The PGK 10 can control the pivoting movement of each roll canard 28b via the CAS 30. The first and second roll canards 28b cooperate to control the roll of the guided projectile 14 while it is in motion after being fired from the launch assembly 56 (FIG. 3).

As stated above, the state estimation system 1 utilizes the geomagnetic field to estimate the roll angle $\phi$ and the roll rate of the guided projectile 14. However, there are additional magnetic fields in addition to the geomagnetic field which distorts the geomagnetic field. In order to accurately estimate the roll angle $\phi$ and the roll rate of the guided projectile 14, corrections must be made to account for the distortion of the geomagnetic field as further described below.

There are many sources of distortion of the geomagnetic field. One source of distortion is referred to as a "hard effect" which is associated with permanent magnetic fields. For example, the guided projectile 14 itself, or components of the guided projectile 14, may have a permanent magnetic field which distorts the geomagnetic field. The guided projectile 14 can become permanently magnetized in various ways, including, but not limited to, movement from one storage location to another as well as through launch of the guided projectile 14. However, the permanent magnetic field of the guided projectile 14 is typically unknown prior to launch, and, therefore, must be accounted for after launch.

In one example, launching the guided projectile 14 causes the guided projectile 14 to become magnetized via, among other things, a shock of the launch, rapid acceleration of the guided projectile 14 through the launching mechanism, and contact made with the launching mechanism. Any hard effects that cause distortion must be accounted for and corrected in order to accurately estimate the roll angle φ and the roll rate of the guided projectile 14 and this cannot be done before launch. The state estimation system 1 estimates the hard effects associated with the guided projectile 14 after launch as further described below. Corrections can be made based upon the estimates of the hard effects.

Another source of distortion is referred to as a "soft effect," which may also be referred to as an "induced magnetic field," which is associated with materials that distort the geomagnetic magnetic field. More particularly, the induced magnetic field is a function of the geometry and the materials of the guided projectile 14 as well as the orientation of the guided projectile 14 relative to the geomagnetic field. Since the geometries and the materials associated with the guided projectile 14 do not change, the induced magnetic field can be estimated before launch and throughout flight of the guided projectile 14 as further described below.

Another source of distortion is magnetic fields created by currents in the guided projectile 14. Components, such as motors and other electronics, being used by the guided projectile 14 generate current, which, in turn, generate magnetic fields which distort the geomagnetic field. For example, when the PGK 10 of the guided projectile 14 activates an actuator of the CAS 30, a current is produced which creates a magnetic field. Since the components creating the currents can be controlled, it is possible to compute the effect of the currents and associated magnetic fields before the components are activated. In other words, a calibration coefficient can be used to determine the effect of currents and associated magnetic fields produced by components of the guided projectile 14 to be corrected as further described below.

Another source of distortion is sensor offsets. For example, the three-axis magnetometer 3 has imperfections and the offsets are typically unknown. The "turn on offset," which is an inherent offset of the sensor, of a low cost magnetic sensor can be significant as compared to the geomagnetic field. Since the offsets are typically unknown, the three-axis magnetometer 3 must be calibrated after launch of the guided projectile 14 as further described below. In another example, there may be drift and bias inherent in the roll gyro 5 that has to be accounted for as further described below.

With primary reference to FIG. 3, the operation of the state estimation system 1 carried by the guided projectile 14 is shown. As shown in FIG. 3, the guided projectile 14 is fired from the launch assembly 56 elevated at a quadrant elevation towards the target 24 located at an estimated or nominal distance 58 from the launch assembly 56. An accurate roll angle φ estimate and/or an accurate roll rate estimate of the guided projectile 14 are needed to steer the guided projectile 14. Stated otherwise, the roll angle φ estimate and/or the roll rate estimate allow steering commands to be applied in the proper direction. Exemplary steering commands include, but are not limited to, up/down turns, left/right turns, and turns in an oblique direction to adjust a trajectory 61 (FIG. 3) of the guided projectile 14. The present disclosure provides a system to estimate the roll angle φ and the roll rate of the guided projectile 14 throughout the trajectory 61 of the guided projectile 14. As the roll angle φ and the roll rate of the guided projectile 14 are estimated, steering commands, produced by the steering logic 33, can be applied to deflect the canards 28a, 28b to precisely guide the guided projectile 14 towards its intended target 24.

An exemplary coordinate system utilized for estimating the roll angle φ and the roll rate is shown in FIG. 2. In one example, the origin of the coordinate system associated with the guided projectile 14 is at the center of gravity of the PGK 10, and the coordinate system has vectors X, Y and Z. The X vector is along the longitudinal axis X1, which is also the spin axis of the PGK 10. The Y vector and the Z vector are oriented orthogonal to the X vector. In one particular embodiment, the three-axis magnetometer 3 is a vector magnetometer, which measures magnetic field strength along the sensor's axes. The vector magnetometer has three axes, and the three axes are aligned to be parallel with the coordinate system associated with the guided projectile 14. This allows the projections of the geomagnetic field, which is represented by vector B (FIG. 2), onto each of the sensor's axes to be obtained.

More particularly, and in operation, the at least one processor 9 of the state estimation system 1 is provided known geomagnetic field vectors. The three-axis magnetometer 3 estimates a magnetic data output associated with a local magnetic field relative to the guided projectile 14. The estimated magnetic data output represents the geomagnetic field and all distortion fields from each of the sources of distortion.

Figure 4:
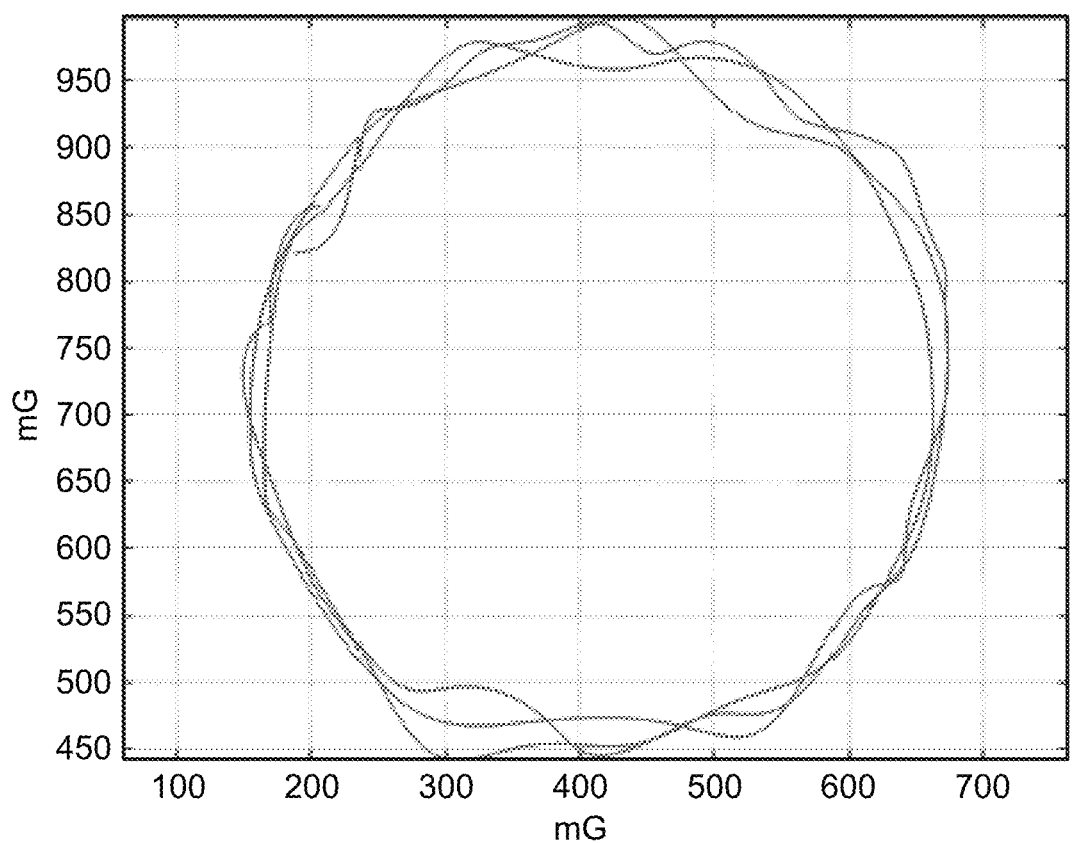
FIG. 4 is a graph of offset calibration data collected from three rotations of the guided projectile.

The first estimation logic 11 estimates a sensor offset of the three axis magnetometer 3, the second estimation logic 13 estimates the first distortion, which is caused by the permanent magnetic field as described above, and the third estimation logic 15 estimates the at least one second distortion. In one example, the sensor offset and the first distortion are estimated by performing a calibration roll. For example, the state estimation system 1 collects offset calibration data from three rotations of the guided projectile 14 early in flight (i.e., within the first ten seconds of flight). FIG. 4 is a graph based on offset calibration data from three rotations of the guided projectile 14. The sensor offset and the first distortion are estimated based on the results of the calibration roll. However, it is envisioned that the sensor offset and the first distortion may be estimated in any other suitable manner. In one example, the at least one second distortion is an induced magnetic field, or a soft effect. In order to reduce the soft effect bias, the three-axis magnetometer 3 is positioned on the spin axis X1 of the PGC 10 of the guided projectile 14. In one example, the third estimation logic 15 utilizes a correction matrix to calculate the induced magnetic field of the guided projectile 14. The induced magnetic field is a function of the heading of the guided projectile 14 with respect to the geomagnetic field. The heading can be determined via the three-axis magnetometer 3. The output of the three-axis magnetometer is the value of X, Y, and Z of the local magnetic field. The correction matrix is applied to the X, Y, and Z values to calculate the expected distortion due to the induced magnetic field or the soft effects. Stated otherwise, the induced magnetic field is a function of a fixed matrix, which in one particular embodiment is a three by three matrix.

In another example, the at least one second distortion is at least one magnetic field caused by eddy currents or other currents produced by the guided projectile 14. In one example, the third estimation logic 15 utilizes a calibration coefficient to estimate the effect of currents and associated magnetic fields produced by the currents to be corrected as further described below.

The first correction logic 17 removes the estimated sensor offset, the estimated first distortion, and the estimated at least one second distortion from the magnetic data output associated with the local magnetic field to provide a corrected magnetic data output associated with the local magnetic field. The geomagnetic logic 19 determines corrected geomagnetic field vectors of the guided projectile 14 based, at least in part, on the known geomagnetic field vectors and the corrected magnetic data output associated with the local magnetic field. The elevation logic 21 determines an elevation of the guided projectile 14 and the azimuth logic 23 determines an azimuth of the guided projectile 14. In one example, the elevation logic 21 and the azimuth logic utilize the IMU 32c to estimate the elevation and azimuth of the guided projectile 14. In another example, since the trajectory 61 follows a traditional ballistic trajectory, the azimuth and elevation estimates are based on the traditional ballistic trajectory and are known in advance. However, the estimates of the azimuth and elevation of the guided projectile 14 can be obtained in any suitable manner.

The roll angle estimation logic 25 estimates a roll angle $\phi$ of the guided projectile 14 based, at least in part, on the corrected geomagnetic field vectors of the guided projectile 14, the elevation of the guided projectile 14, and the azimuth of the guided projectile 14. The roll gyro 5 estimates a roll rate of the guided projectile 14. The integration logic 27 integrates the estimated roll rate. The merging logic 29 merges the estimated roll angle $\phi$ with the integrated estimated roll rate to provide an updated estimated roll angle $\phi$ of the guided projectile 14 and an estimated bias of the roll gyro 5. The second correction logic 31 removes the bias of the roll gyro 5 to provide an updated estimated roll rate of the guided projectile 14. In one example, the merging logic 29 utilizes a Kalman filter to merge the estimated roll angle $\phi$ with the integrated estimated roll rate; however, the estimated roll angle $\phi$ may be merged with the integrated estimated roll rate in any suitable manner.

The merging logic 29 is utilized because the signal-to-noise ratio (SNR) of the estimated roll angle $\phi$ based on the three-axis magnetometer 3 decreases when the guided projectile 14 is aligned with the geomagnetic field. Therefore, the output of the roll gyro 5 must be utilized when the guided projectile 14 is aligned with the geomagnetic field. The merging logic 29 also estimates the roll gyro 5 bias for proportional-integral-derivative (PID) roll control of the guided projectile 14.

More particularly, and in some cases, the guided projectile 14 may be traveling directly parallel to the geomagnetic field, and, in these cases, the state estimation system 1 cannot estimate the roll angle $\phi$ by only utilizing the three-axis magnetometer 3. This is due to the fact that the guided projectile 14 can roll anywhere along that path and the data from the three-axis magnetometer 3 would be the same. In other words, in these cases, the spin axis X1 of the guided projectile 14 is parallel to the geomagnetic field, and, when this occurs, the state estimation system 1 cannot determine which direction the guided projectile 14 is headed. For example, if the geomagnetic field is at an inclination of sixty degrees, and if the guided projectile 14 is traveling at the same inclination of sixty degrees, then the state estimation system 1 cannot estimate the roll angle $\phi$ based only on utilizing the three-axis magnetometer 3. However, if this occurs, it only occurs during a portion of the trajectory 61 of the guided projectile 14. For example, the guided projectile 14 can travel along a first portion of the trajectory 61 where the guided projectile 14 is not parallel to the geomagnetic field, and the state estimation system 1 can estimate the roll angle $\phi$ by utilizing the three-axis magnetometer 3. The guided projectile 14 can travel along a second portion of the trajectory 61 where the guided projectile 14 is parallel to the geomagnetic field, and the state estimation system 1 cannot estimate the roll angle $\phi$ by only utilizing the three-axis magnetometer 3. The state estimation system 1 can determine whether the guided projectile 14 is parallel to the geomagnetic field by analyzing the output data from the three-axis magnetometer 3 and the output of the roll gyro 5. The roll gyro 5 is integrated and can be used when the guided projectile 14 is aligned to the geomagnetic field, and the bias of the roll gyro 5 can be determined when the guided projectile 14 is not aligned with the geomagnetic field by comparing the output of the roll gyro 5 with the estimated roll angle $\phi$ from the three-axis magnetometer 3 such as, for example, by using the Kalman filter.

As stated above, the three-axis magnetometer 3 is positioned on the guided projectile 14 such that the X vector of the three-axis magnetometer 3 is along the spin axis X1 of the guided projectile 14, and the Y vector and Z vector are perpendicular to the X vector. When the X vector is parallel to the geomagnetic field, the three-axis magnetometer 3 outputs an X vector having a non-zero value, a Y vector having a zero value and a Z vector having a zero value. When the Y vector and Z vector are both zero values, this indicates that the guided projectile 14 is parallel to the geomagnetic field. For example, if the guided projectile 14 is traveling along the equator where the geomagnetic field does not have any inclination, and the guided projectile 14 is not traveling parallel to the geomagnetic field, the values of the Y vector and the Z vector can be used to estimate the roll angle $\phi$ by taking an arctangent of the Y vector value and the Z vector value to determine the roll angle $\phi$. However, once the guided projectile 14 becomes parallel with the geomagnetic field, the values of the Y vector and the Z vector cannot be used to determine the roll angle $\phi$.

In order to estimate the roll angle $\phi$ of the guided projectile 14 when the guided projectile 14 is traveling parallel to the geomagnetic field, the state estimation system 1 utilizes the roll gyro 5 to estimate the rate of change of the roll angle $\phi$ as the guided projectile 14 travels parallel to the geomagnetic field. However, the roll gyro 5 may have some drift and bias inherent in the sensor that has to be accounted for and corrected. Therefore, the state estimation system 1 utilizes the three-axis magnetometer 3 to determine when the guided projectile 14 is not rolling, and, when the roll rate is zero, the state estimation system 1 estimates the bias of roll gyro 5 before the guided projectile 14 is traveling parallel to the geomagnetic field. Once the bias of the roll gyro 5 is removed before the guided projectile 14 travels parallel to the geomagnetic field, the state estimation system 1 utilizes the roll gyro 5 to indicate the roll rate of the guided projectile 14. The state estimation system 1 knows the roll angle from the corrected output of the three-axis magnetometer 3 before the guided projectile 14 enters the portion of the trajectory 61 where the guided projectile 14 travels parallel to the geomagnetic field, then the output data from the roll gyro 5 can be utilized to determine the roll angle $\phi$ of the PGK 10 as described above.

Therefore, the state estimation system 1 utilizes the three-axis magnetometer 3 in conjunction with the roll gyro 5 to continuously provide an updated estimated roll angle $\phi$ and updated estimated roll rate of the guided projectile 14 as it travels along the trajectory 61, even in the case where the guided projectile 14 travels parallel to the geomagnetic field.

More particularly, the state estimation system 1 estimates the roll angle φ where φ equals:

$$\ldots atan\left(\frac{[bzm(bey*\cos(az)-bex*\sin(az)]-bym(bez*\cos(el)+bex*\cos(az)*\sin(el)+bey*\sin(el)*\sin(az))}{(bym[bey*\cos(az)-bex*\sin(az)]+bzm(bez*\cos(el)+bex*\cos(az)*\sin(el)+bey*\sin(el)*\cos(az)}\right)$$

Equation (1)
where bex, bey, bez are the known geomagnetic field vectors, bxm, bym, and bzm are the corrected measured magnetic field vectors, az is azimuth, and el is elevation. The known geomagnetic field vectors are loaded into the guided projectile 14 before launch or during launch. The state estimation system 1 utilizes a Kalman filter to combine the data from the three-axis magnetometer 3 and the roll gyro 5 as described above.

The steering logic 33 steers the guided projectile 14 based, at least in part, on the updated estimated roll angle, which is shown generally at 702 of the guided projectile 14 and/or the updated estimated roll rate of the guided projectile 14.

Figure 5:
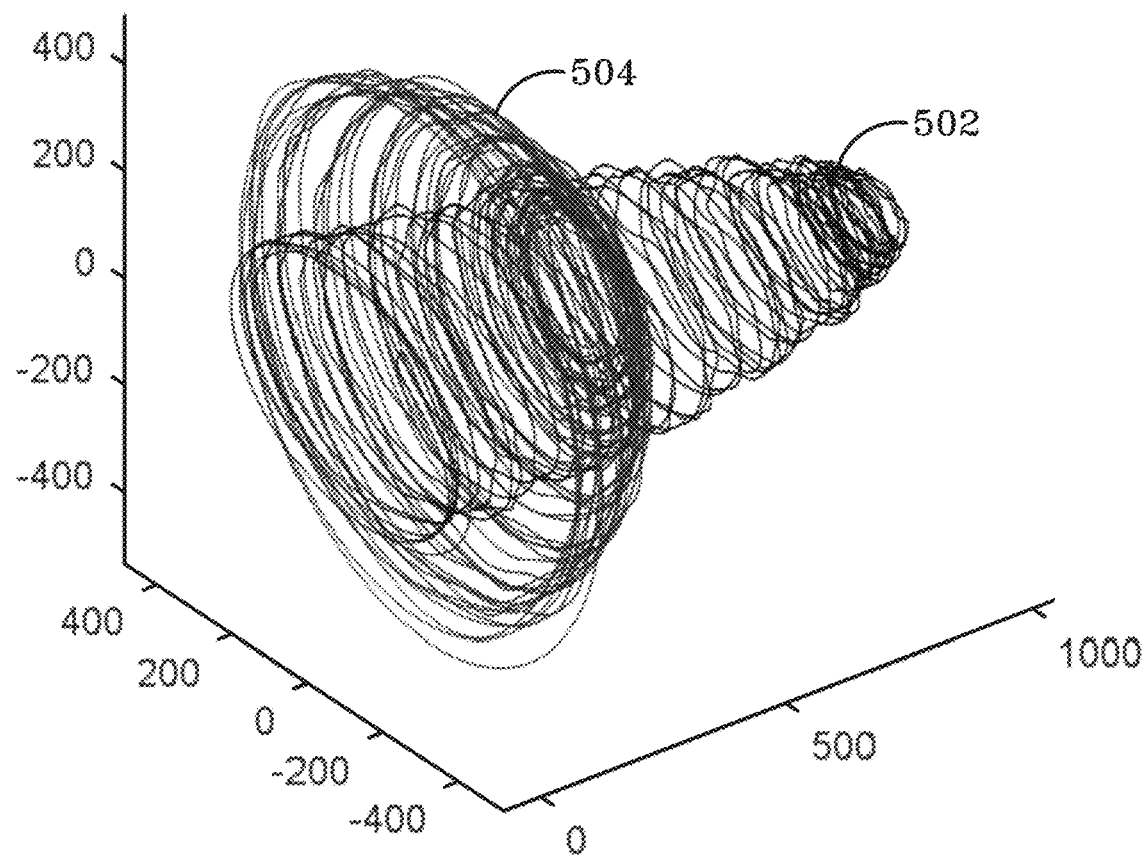
FIG. 5 is a simulation representing simulated soft effects and hard effects to the guided projectile along a flight path.
Figure 6:
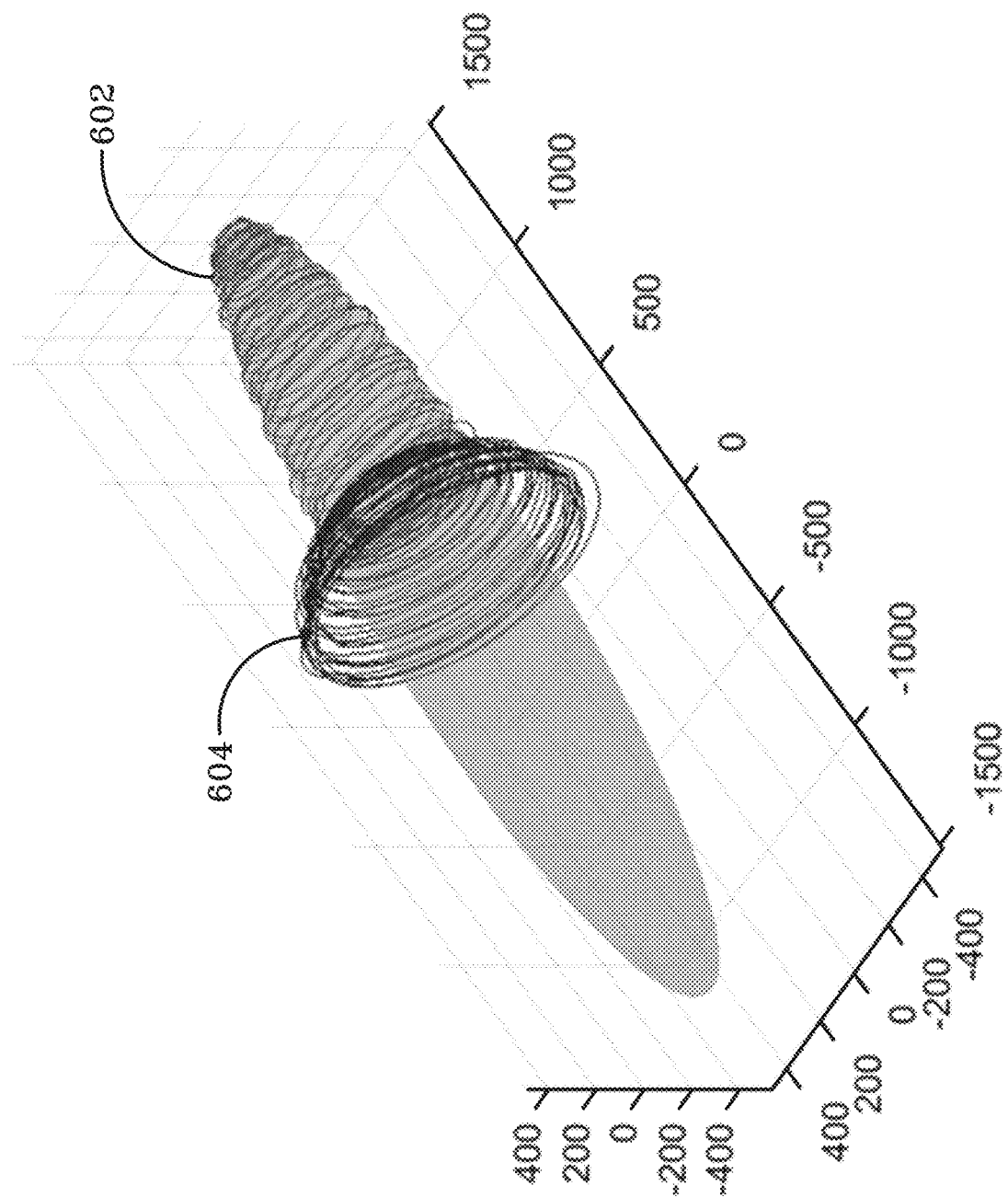
FIG. 6 is a simulation representing simulated soft effects and hard effects to the guided projectile along a flight path.

FIG. 5 represents simulated soft effects and hard effects to the guided projectile 14 along a flight path. The soft effects are represented by lines 502 and the hard effects are represented by lines 504. FIG. 6 represents simulated soft effects and hard effects to the guided projectile 14 along a flight path. The soft effects are represented by lines 602 and the hard effects are represented by lines 604. The following equations are utilized to derive the corrected measured magnetic field vectors:

Bmeas=B+M*B−offs=(I+M)*B−offs      Equation (2)

where B=C*(Bmeas+offs), (I+M)=C$^{-1}$, and M=C$^{-1}$−I. The state estimation system 1 utilizes the results from Equation (2) in Equation (1) to estimate the roll angle φ.

Figure 7:
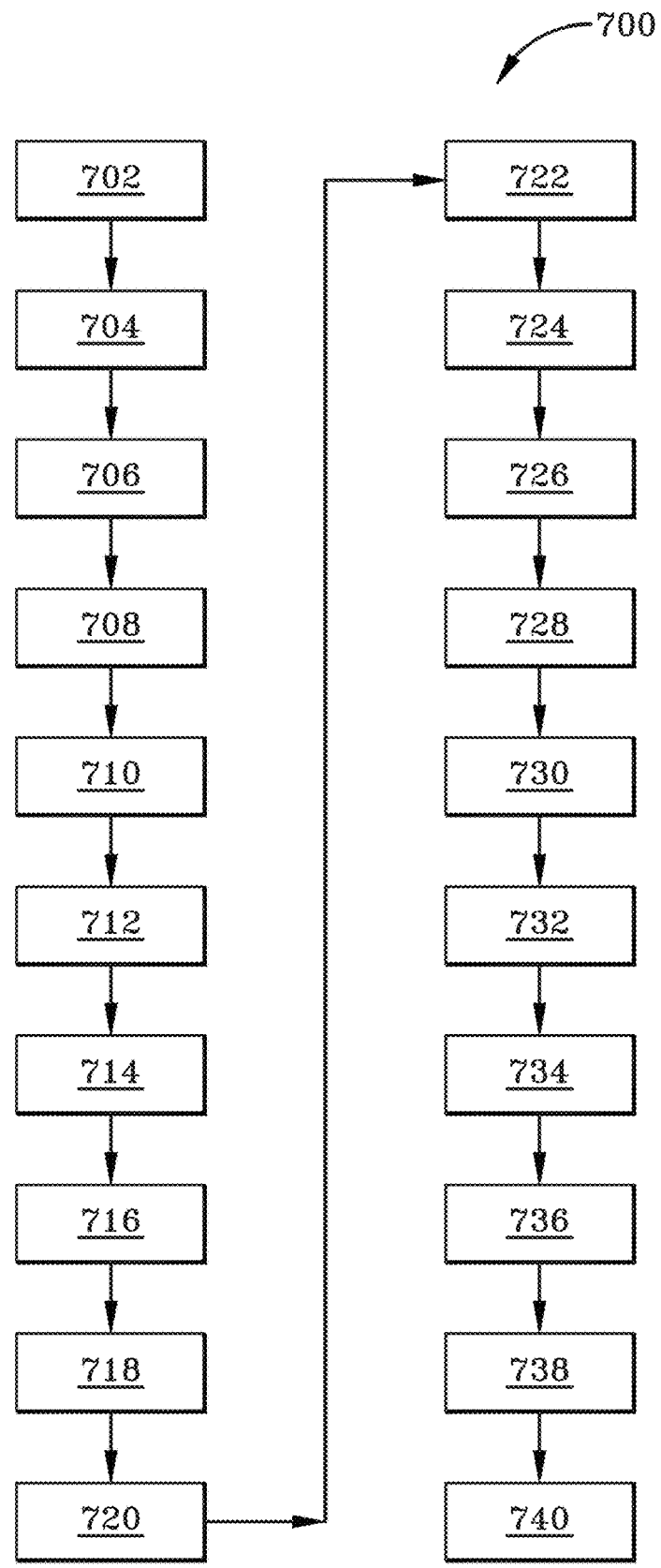
FIG. 7 is a flow chart of one method or process in accordance with the present disclosure.

FIG. 7 is a flow chart of one method or process in accordance with the present disclosure and is generally indicated at 700. The method 700 includes providing known geomagnetic field vectors to a spinning projectile 14, which is shown generally at 702. The method 700 includes firing the guided projectile 14 from a launch assembly 56 towards a target 24, which is shown generally at 704. The method 700 includes estimating a sensor offset of at least one magnetic sensor 3, which is shown generally at 706. In one example, the at least one magnetic sensor is a three-axis magnetometer. The method 700 estimates a first distortion caused by a first source of distortion; wherein the first source of distortion is a permanent magnetic field of the guided projectile 14, which is shown generally at 708.

The method 700 further includes estimating at least one second distortion caused by at least one second source of distortion, which is shown generally at 710. The method 700 includes estimating, with the at least magnetic sensor 3, a magnetic data output associated with a local magnetic field relative to the guided projectile 14, which is shown generally at 712. The method 700 includes removing the estimated sensor offset, the estimated first distortion, and the estimated at least one second distortion from the magnetic data output associated with the local magnetic field to provide a corrected magnetic data output associated with the local magnetic field, which is shown generally at 714. The method 700 includes determining corrected geomagnetic field vectors of the guided projectile 14 based, at least in part, on the known geomagnetic field vectors and the corrected magnetic data output associated with the local magnetic field, which is shown generally at 716.

The method 700 further includes determining an elevation of the guided projectile 14, which is shown generally at 718. The method 700 includes determining an azimuth of the guided projectile 14, which is shown generally at 720. The method 700 includes estimating a roll angle φ of the guided projectile 14 based, at least in part, on the corrected geomagnetic field vectors of the guided projectile 14, the elevation of the guided projectile 14, and the azimuth of the guided projectile 14, which is shown generally at 722. The method 700 includes estimating, with at least one angular rate sensor 5, a roll rate of the guided projectile 14, which is shown generally at 724. In one example, the at least one angular rate sensor 5 is a roll gyro. The method 700 includes integrating the estimated roll rate, which is shown generally at 726. The method 700 includes merging the estimated roll angle φ with the integrated estimated roll rate to provide an updated estimated roll angle φ of the guided projectile 14 and an estimated bias of the at least one angular rate sensor 5, which is shown generally at 728. In one example, merging the estimated roll angle with the integrated estimated roll rate to provide an updated estimated roll angle of the spinning projectile and an estimated bias of the at least one angular rate sensor is accomplished via a Kalman filter.

The method 700 includes removing the bias of the at least one angular rate sensor 5 to provide an updated estimated roll rate of the guided projectile 14, which is shown generally at 730. The method 700 includes steering the guided projectile 14 based, at least in part, on the updated estimated roll angle of the guided projectile 14 and/or the updated estimated roll rate of the guided projectile 14, which is shown generally at 732. The method 700m includes allowing the guided projectile 14 to complete at least one revolution before estimating the sensor offset of the at least one magnetic sensor 3 and the first distortion caused by the first source of distortion, which is shown generally at 734.

In one example, the at least one second distortion is an induced magnetic field of the spinning projectile, and the method 700 further includes applying a correction matrix to the magnetic data output associated with the local magnetic field to remove the induced magnetic field of the guided projectile 14, which is shown generally at 736. In another example, the at least one second distortion is at least one magnetic field produced by at least one current, and the method 700 further includes applying a calibration coefficient to the magnetic data output associated with the local magnetic field to remove effects of the at least one magnetic field produced by the at least one current, which is shown generally at 738. The method 700 further includes providing a precision guidance kit on the guided projectile 14, which is shown generally at 740.

It is to be understood that the various logics, such as the first estimation logic 11, the second estimation logic 13, the third estimation logic 15, the first correction logic 17, the geomagnetic logic 19, the elevation logic 21, the azimuth logic 23, the roll angle estimation logic 25, the integration logic 27, the merging logic 29, the second correction logic 31, and the steering logic 33 may utilize any suitable number of non-transitory computer readable storage mediums and any suitable number of processors. For example, and not meant as a limitation, the various logics can be stored on one non-transitory computer readable storage medium or multiple computer readable storage mediums and the various logics can be processed by any suitable number of processors.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer utilized to execute the software code or instructions via its processors may have one or more input and output devices. Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method comprising:
providing known geomagnetic field vectors to a spinning projectile;
firing the spinning projectile from a launch assembly towards a target;
estimating a sensor offset of at least one magnetic sensor;
estimating a first distortion caused by a first source of distortion; wherein the first source of distortion is a permanent magnetic field of the spinning projectile;
estimating at least one second distortion caused by at least one second source of distortion;
estimating, with the at least magnetic sensor, a magnetic data output associated with a local magnetic field relative to the spinning projectile;
removing the estimated sensor offset, the estimated first distortion, and the estimated at least one second distortion from the magnetic data output associated with the local magnetic field to provide a corrected magnetic data output associated with the local magnetic field;
determining corrected geomagnetic field vectors of the spinning projectile based, at least in part, on the known geomagnetic field vectors and the corrected magnetic data output associated with the local magnetic field;
determining an elevation of the spinning projectile;
determining an azimuth of the spinning projectile;
estimating a roll angle of the spinning projectile based, at least in part, on the corrected geomagnetic field vectors of the spinning projectile, the elevation of the spinning projectile, and the azimuth of the spinning projectile;
estimating, with at least one angular rate sensor, a roll rate of the spinning projectile;
integrating the estimated roll rate;
merging the estimated roll angle with the integrated estimated roll rate to provide an updated estimated roll angle of the spinning projectile and an estimated bias of the at least one angular rate sensor; and
removing the bias of the at least one angular rate sensor to provide an updated estimated roll rate of the spinning projectile.

2. The method of claim 1, further comprising:
steering the spinning projectile based, at least in part, on the updated estimated roll angle of the spinning projectile.

3. The method of claim 1, further comprising:
steering the spinning projectile based, at least in part, on the updated estimated roll rate of the spinning projectile.

4. The method of claim 1, further comprising:
allowing the spinning projectile to complete at least one revolution before estimating the sensor offset of the at least one magnetic sensor and the first distortion caused by the first source of distortion.

5. The method of claim 1, wherein the at least one second distortion is an induced magnetic field of the spinning projectile; the method further comprising:
applying a correction matrix to the magnetic data output associated with the local magnetic field to remove the induced magnetic field of the spinning projectile.

6. The method of claim 1, wherein the at least one second distortion is at least one magnetic field produced by at least one current; the method further comprising:
applying a calibration coefficient to the magnetic data output associated with the local magnetic field to remove effects of the at least one magnetic field produced by the at least one current.

7. The method of claim 1, further comprising:
providing a precision guidance kit on the spinning projectile.

8. The method of claim 1, wherein merging the estimated roll angle with the integrated estimated roll rate to provide an updated estimated roll angle of the spinning projectile and an estimated bias of the at least one angular rate sensor is accomplished via a Kalman filter.

9. The method of claim 1, wherein the at least one magnetic sensor is a three-axis magnetometer.

10. The method of claim 1, wherein the at least one angular rate sensor is a roll gyro.

11. A state estimation system for a spinning projectile, comprising:
at least one processor that receives known geomagnetic field vectors;
at least one magnetic sensor that estimates a magnetic data output associated with a local magnetic field relative to the spinning projectile;
a first source of distortion providing a first distortion; wherein the first source of distortion is a permanent magnetic field of the spinning projectile;
first estimation logic that estimates a sensor offset of the at least one magnetic sensor;
second estimation logic that estimates the first distortion;
at least one second distortion source providing at least one second distortion;
third estimation logic that estimates the second distortion;
first correction logic that removes the estimated sensor offset, the estimated first distortion, and the estimated at least one second distortion from the magnetic data output associated with the local magnetic field to provide a corrected magnetic data output associated with the local magnetic field; and
geomagnetic logic that determines corrected geomagnetic field vectors of the spinning projectile based, at least in part, on the known geomagnetic field vectors and the corrected magnetic data output associated with the local magnetic field;
elevation logic that determines an elevation of the spinning projectile;
azimuth logic that determines an azimuth of the spinning projectile;
roll angle estimation logic that estimates a roll angle of the spinning projectile based, at least in part, on the corrected geomagnetic field vectors of the spinning projectile, the elevation of the spinning projectile, and the azimuth of the spinning projectile;
at least one angular rate sensor that estimates a roll rate of the spinning projectile;
integration logic that integrates the estimated roll rate;
merging logic that merges the estimated roll angle with the integrated estimated roll rate to provide an updated estimated roll angle of the spinning projectile and an estimated bias of the at least one angular rate sensor; and
second correction logic that removes the bias of the at least one angular rate sensor to provide an updated estimated roll rate of the spinning projectile.

12. The state estimation system of claim 11, further comprising:
steering logic that steers the spinning projectile based, at least in part, on the updated estimated roll angle of the spinning projectile.

13. The state estimation system of claim 11, further comprising:
steering logic that steers the spinning projectile based, at least in part, on the updated estimated roll rate of the spinning projectile.

14. The state estimation system of claim 11, further comprising:
a central longitudinal axis of the spinning projectile; and
a first magnetic field vector of the at least one magnetic sensor positioned along the central longitudinal axis of the spinning.

15. The state estimation system of claim 14, further comprising:
a second magnetic field vector of the at least one magnetic sensor orthogonal to the first magnetic field vector; and
a third magnetic field vector of the at least one magnetic sensor orthogonal to the first magnetic field vector.

16. The state estimation system of claim 11, further comprising:
a precision guidance kit carried by the spinning projectile; wherein the precision guidance kit comprises:
a canard assembly including at least one canard that is moveable.

17. The state estimation system of claim 16, wherein the at least one magnetic sensor and the at least one angular rate sensor are carried by the precision guidance kit.

18. The state estimation system for a spinning projectile of claim 11, wherein the at least one magnetic sensor is a three-axis magnetometer.

19. The state estimation system for a spinning projectile of claim 11, wherein the at least one angular rate sensor is a roll gyro.

20. The state estimation system of claim 11, wherein the at least one second distortion is at least one of an induced magnetic field, a magnetic field produced by at least one current associated with the spinning projectile, and a magnetic field produced by at least one eddy current.

* * * * *